United States Patent
Reddy et al.

(10) Patent No.: US 10,294,408 B2
(45) Date of Patent: May 21, 2019

(54) LOW-TOXICITY, POLYMERIZABLE AQUEOUS CONSOLIDATION COMPOSITIONS FOR USE IN SUBTERRANEAN FORMATION CONSOLIDATION TREATMENTS

(71) Applicant: Halliburton Energy Services, Inc., Houston, TX (US)

(72) Inventors: B. Raghava Reddy, The Woodlands, TX (US); Feng Liang, Cypress, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 620 days.

(21) Appl. No.: 14/786,594

(22) PCT Filed: Sep. 12, 2013

(86) PCT No.: PCT/US2013/059356
§ 371 (c)(1),
(2) Date: Oct. 23, 2015

(87) PCT Pub. No.: WO2015/038123
PCT Pub. Date: Mar. 19, 2015

(65) Prior Publication Data
US 2016/0280984 A1 Sep. 29, 2016

(51) Int. Cl.
*C09K 8/575* (2006.01)
*C09K 8/68* (2006.01)
(Continued)

(52) U.S. Cl.
CPC ................ *C09K 8/575* (2013.01); *C09K 8/68* (2013.01); *E21B 43/26* (2013.01); *E21B 43/267* (2013.01)

(58) Field of Classification Search
CPC ...................................................... C09K 8/508
See application file for complete search history.

(56) References Cited

U.S. PATENT DOCUMENTS 4,042,032 A * 8/1977 Anderson ............ C09K 8/5086
166/276
4,085,160 A 4/1978 Anderson et al.
(Continued)

FOREIGN PATENT DOCUMENTS

FR 1113937 A 4/1956
GB 1303456 A 1/1973
(Continued)

OTHER PUBLICATIONS

International Search Report and Written Opinion for PCT/US2013/059356 dated Jun. 25, 2014.

*Primary Examiner* — William D Hutton, Jr.
*Assistant Examiner* — Avi T Skaist
(74) *Attorney, Agent, or Firm* — McGuireWoods LLP

(57) ABSTRACT

Some embodiments herein described relate to method comprising: providing a portion of a subterranean formation comprising unconsolidated particulates; introducing a polymerizable aqueous consolidation composition into the portion of the subterranean formation so as to contact the unconsolidated particulates with the polymerizable aqueous consolidation composition, thereby creating coated, unconsolidated particulates; introducing a substantially solids-free, aqueous flush fluid into the portion of the subterranean formation so as to remove the polymerizable aqueous consolidation composition from interstitial spaces between the coated, unconsolidated particulates; introducing a water-soluble polymerization initiator composition into the portion of the subterranean formation so as to contact the coated, unconsolidated particulates; and consolidating the coated,
(Continued)

unconsolidated particulates in the portion of the subterranean formation.

8 Claims, 1 Drawing Sheet

(51) Int. Cl.
*E21B 43/26* (2006.01)
*E21B 43/267* (2006.01)

(56) References Cited

U.S. PATENT DOCUMENTS

| | | |
|---|---|---|
| 4,312,605 A | 1/1982 | Clarke |
| 4,318,835 A | 3/1982 | Clarke |
| 4,339,370 A | 7/1982 | Parker |
| 5,250,645 A | 10/1993 | Maurer |
| 5,342,149 A | 8/1994 | McCabe et al. |
| 5,470,425 A | 11/1995 | Discho |
| 5,501,275 A | 3/1996 | Card et al. |
| 2006/0035790 A1 | 2/2006 | Okell et al. |
| 2007/0114032 A1 | 5/2007 | Stegent et al. |
| 2011/0146997 A1 | 6/2011 | Nguyen et al. |
| 2012/0298357 A1 | 11/2012 | Ezell et al. |

FOREIGN PATENT DOCUMENTS

| | | |
|---|---|---|
| WO | 2015038122 A1 | 3/2015 |
| WO | 2015038123 A1 | 3/2015 |

\* cited by examiner

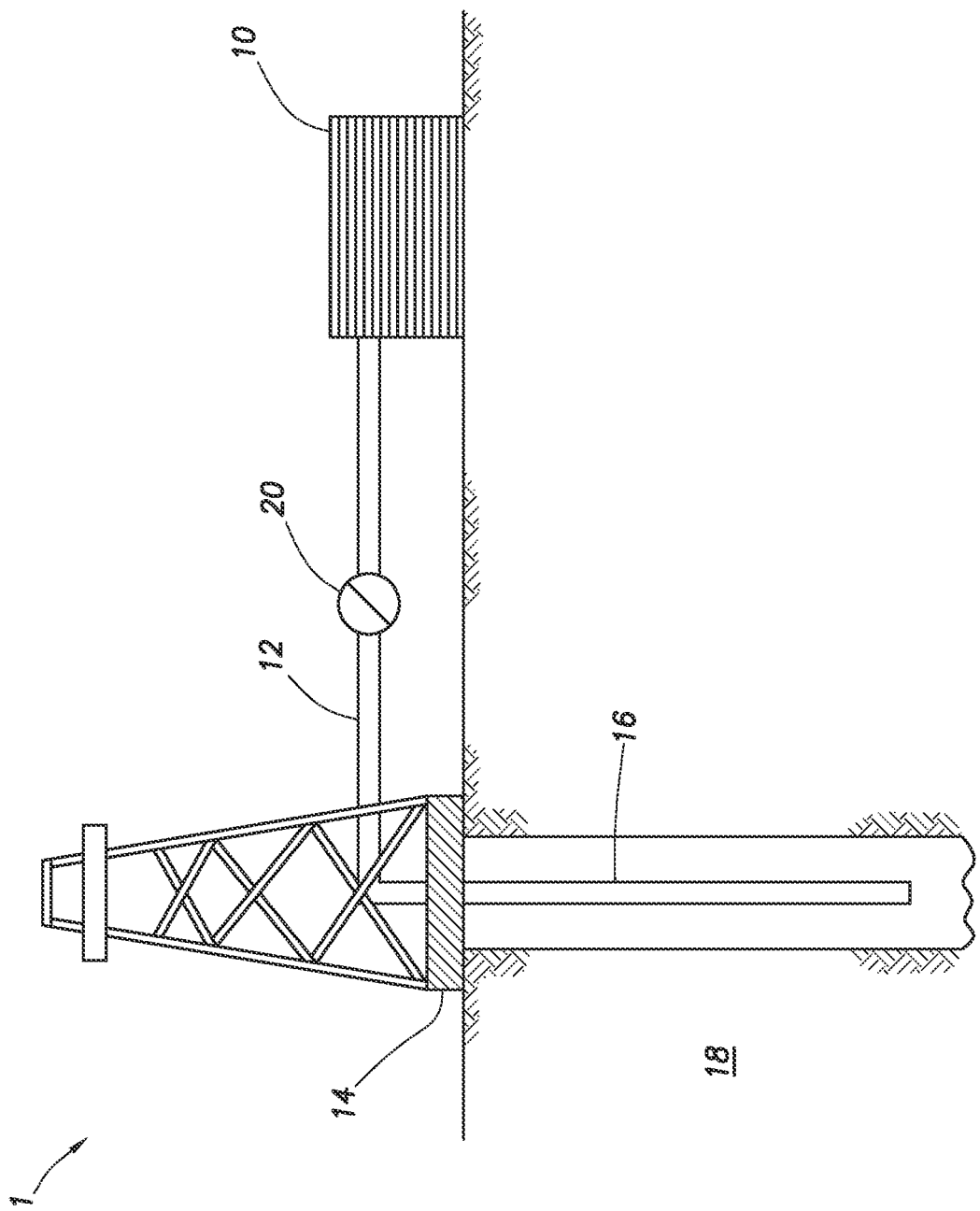

LOW-TOXICITY, POLYMERIZABLE AQUEOUS CONSOLIDATION COMPOSITIONS FOR USE IN SUBTERRANEAN FORMATION CONSOLIDATION TREATMENTS

BACKGROUND

The methods disclosed herein relate to the use of low-toxicity, polymerizable aqueous consolidation compositions for use in subterranean formation consolidation treatments.

Subterranean wells (e.g., hydrocarbon producing wells, water producing wells, and the like) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids, such as graded sand, are suspended in a portion of the treatment fluid and then deposited into the fractures. These particulate solids, or "proppant particulates," serve to prop the fracture open (e.g., keep the fracture from fully closing) after the hydraulic pressure is removed. By keeping the fracture from fully closing, the proppant particulates aid in forming conductive paths through which produced fluids, such as hydrocarbons, may flow.

The degree of success of a fracturing operation depends, at least in part, upon fracture porosity and conductivity once the fracturing operation is complete and production is begun. Traditional fracturing operations place proppant particulates into a fracture to form a "proppant pack" in order to ensure that the fracture does not close completely upon removing the hydraulic pressure. The ability of proppant particulates to maintain a fracture open depends upon the ability of the proppant particulates to remain in the fracture and withstand fracture closure pressures. The porosity of a proppant pack available for fluid flow within a fracture is related to the interconnected interstitial spaces between abutting proppant particulates. Thus, the fracture porosity is closely related to the strength of the placed proppant particulates. It is therefore important to a fracturing operation that the proppant pack remain intact and that individual proppant particulates do not generally become disassociated from the proppant pack.

During fracturing operations, the formation is broken down to form fractures and formation particulates or fines are dislodged from the formation. These fines, along with any loose proppant particulates or other particulates, for example, may flow-back with produced formation fluids. The flow-back of these unconsolidated particulates may erode metal goods, plug piping and other vessels, damage valves, instruments, and other production equipment. Moreover, the flow-back of these unconsolidated particulates may severely restrict or interrupt production and may require additional time and cost to remove the unconsolidated particulates from the produced fluids.

It is therefore desirable to provide an improved method of consolidating unconsolidated particulates in a subterranean formation.

BRIEF DESCRIPTION OF THE DRAWINGS

The following FIGURES are included to illustrate certain aspects of the embodiments herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the consolidating agent composition comprising treatment fluids of the embodiments described herein to a downhole location.

DETAILED DESCRIPTION

The methods disclosed herein relate to the use of low-toxicity, polymerizable aqueous consolidation compositions for use in subterranean formation consolidation treatments. Specifically, the methods disclosed herein relate to polymerizable aqueous consolidation compositions and water-soluble polymerization initiator compositions that are water-soluble in unreacted form, and when reacted form resilient, water-insoluble polymers with consolidation characteristics having tailorable consolidation times. As such, subsequent to consolidation reactions, the polymerizable aqueous consolidation compositions and water-soluble polymerization initiator compositions described herein do not suffer from leaching in aqueous fluids. As defined herein, "water-soluble" and all of its variants (e.g., "water solubility") refers to a chemical or compound that can be dissolved in water at a concentration of greater than about 5%.

The polymerizable aqueous consolidation compositions and water-soluble polymerization initiator compositions are water-soluble in unreacted form and, thus, are water dilutable, as well. Moreover, they are low-toxic compositions that are acceptable for use in aquifer zones for potable water applications and may be easily transported in accordance with U.S. Department of Transportation regulations.

Although some embodiments described herein are illustrated by reference to hydraulic stimulation treatments, the polymerizable aqueous consolidation compositions and the water-soluble polymerization initiator composition combinations disclosed herein may be used in any subterranean formation operation that may benefit from consolidation of particulates. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof.

Moreover, the polymerizable aqueous consolidation compositions and the water-soluble polymerization initiator composition combinations described herein may be used in any non-subterranean operation that may benefit from their consolidation properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, a method of consolidating unconsolidated particulates in a portion of a subterranean formation is disclosed herein comprising introducing a polymerizable aqueous consolidation composition into a portion of the subterranean formation so as to contact unconsolidated particulates therein with the polymerizable aqueous consolidation composition, thereby creating coated, unconsolidated particulates. The polymerizable aqueous consolidation composition comprises an aqueous base fluid, a polyvalent metal salt of a carboxylic acid (R—COOH) wherein R is a polymerizable olefinically unsaturated functional group (referred to herein in shorthand as "polyvalent metal salt of a carboxylic acid"), and optionally, at least one polymerization agent selected from the group consisting of: an amine; an amino alcohol; and any combination thereof. As used herein, the term "polyvalent metal" refers to a metal ion having a positive charge that is greater than about 2+, include 2+, 3+, 4+, 5+, and the like. A substantially solids-free, aqueous flush fluid is also introduced into the portion of the subterranean formation so as to remove the polymerizable aqueous consolidation composition from interstitial spaces between the coated, unconsolidated particulates. As used herein, the term "substantially solids-free" refers to a fluid having less than 10%, 9%, 8%, 7%, 6%, 5%, 4%, 3%, 2%, 1%, 0.1% or even 0% by weight of solid particulates included therein. A water-soluble polymerization initiator composition comprising an aqueous base fluid and a water-soluble polymerization initiator is introduced into the portion of the subterranean formation so as to contact and consolidate the coated, unconsolidated particulates. As used herein, the term "polymerization agent" refers to any solid that may accelerate the polymerization rate(s) of the polymerizable aqueous consolidation composition when used alone or in combination with either of the polymerizable aqueous consolidation composition or the polymerization initiator composition. The water-soluble polymerization initiator initiates polymerization and curing of the polyvalent metal salt of a carboxylic acid in the polymerizable aqueous consolidation composition either alone or, when present, in combination with the polymerization agent(s) in the polymerizable aqueous consolidation composition. In some embodiments, the unconsolidated particulates are proppant particulates in a proppant pack in a fracture in the portion of the subterranean formation.

In other embodiments, a method comprising consolidating proppant particulates in a fracture in a portion of a subterranean formation is disclosed herein comprising introducing a polymerizable aqueous consolidation composition into a portion of the subterranean formation at a rate and pressure sufficient to create or enhance at least one fracture therein. The polymerizable aqueous consolidation composition comprises an aqueous base fluid, a polyvalent metal salt of a carboxylic acid (R—COOH) wherein R is a polymerizable olefinically unsaturated functional group, and optionally, at least one polymerization agent selected from the group consisting of: an amine; an amino alcohol; and any combination thereof. The proppant particulates are coated with the polymerizable aqueous consolidation composition and are placed into the at least one fracture so as to form a proppant pack. A substantially solids-free, aqueous flush fluid is also introduced into the portion of the subterranean formation so as to remove the polymerizable aqueous consolidation composition from interstitial spaces between the coated, proppant particulates in the proppant pack. A water-soluble polymerization initiator composition comprising an aqueous base fluid and a water-soluble polymerization initiator is introduced into the portion of the subterranean formation so as to contact and consolidate the coated, proppant particulates in the proppant pack.

In some embodiments, the polymerizable aqueous consolidation composition may be introduced into the portion of the subterranean formation as a pill. As used herein, the term "pill" refers to a relatively small volume of fluid placed or circulated within the subterranean formation. In some embodiments, the polymerizable aqueous consolidation composition may be introduced as a pill so as to accomplish consolidation of a specific zonal area in a subterranean formation, where use of a larger volume of the polymerizable aqueous consolidation composition would be unnecessary.

The water-soluble polymerization initiator composition may comprise a water-soluble polymerization initiator selected from the group consisting of an organic water-soluble polymerization initiator; an inorganic water-soluble polymerization initiator; and any combination thereof. In some embodiments, the water-soluble polymerization initiator selected is the organic water-soluble polymerization initiator and the steps described herein of introducing the polymerizable aqueous consolidation composition and introducing the water-soluble polymerization initiator composition are performed simultaneously, followed by the step of introducing a substantially solids-free, aqueous flush fluid into the subterranean formation so as to remove the polymerizable aqueous consolidation composition from interstitial spaces between unconsolidated particulates or proppant particulates in a proppant pack. In other embodiments, the water-soluble polymerization initiator selected is the inorganic water-soluble polymerization initiator composition and the steps described herein of introducing the polymerizable aqueous consolidation composition and introducing the water-soluble polymerization initiator composition are separated by the step of introducing a substantially solids-free, aqueous flush fluid into the subterranean formation so as to remove the polymerizable aqueous consolidation composition from interstitial spaces between unconsolidated particulates or proppant particulates in a proppant pack. In some embodiments, the water-soluble polymerization initiator may be encapsulated with a coating (e.g., a porous coating that allows the water-soluble polymerization initiator to diffuse through slowly, a degradable coating that degrades downhole such as by temperature or pressure, and the like). Such encapsulation may be used to control polymerization times, particularly at certain temperatures or pressures.

Introduction of the polymerizable aqueous consolidation composition and the inorganic water-soluble polymerization initiator composition may preferably be separated by the step of introducing the substantially solids-free aqueous flush fluid so as to ensure that premature polymerization of the polymerizable aqueous consolidation composition does not occur. In some cases, the inorganic water-soluble polymerization initiator and the amine and/or amino alcohol polymerization agents may react immediately or near immediately (e.g., 10 minutes or less) to polymerize and cure the polyvalent metal salt of a carboxylic acid. In those subterranean treatments where the treatment is expected to exceed this time limit, separating introduction of the polymerizable aqueous consolidation composition and introduction of the water-soluble polymerization initiator composition may prevent rapid polymerization and curing within the fluid prior to contacting the desired zone in the formation or at unwanted zones within the formation.

The organic water-soluble polymerization initiator may polymerize the polymerizable aqueous consolidation composition after a greater elapse of time as compared to an inorganic water-soluble polymerization initiator due to longer half-life durations at a given temperature, for example. Also due to the delayed polymerization time, in some embodiments, the organic water-soluble polymerization initiator composition may be introduced into the subterranean formation simultaneously with the polymerizable aqueous consolidation composition. However, they may be introduced separately with the step of introducing the substantially, solids-free aqueous flush fluid therebetween. One of ordinary skill in the art, with the benefit of this disclosure, will recognize whether to introduce the organic water-soluble polymerization initiator composition simultaneously with (e.g., in a single fluid) or separately from the polymerizable aqueous consolidation composition. Factors that may affect this decision may include, the specific formulation of the polymerizable aqueous consolidation composition, the type of organic water-soluble polymerization initiator selected, the time required to complete the subterranean treatment, and the like.

The methods disclosed herein may be used to treat a portion of a subterranean formation comprising unconsolidated particulates. These unconsolidated particulates (e.g., sand, fines, and other particulates) may be formed due to insufficient cohesive strength caused by poor inter-particulate binding between individual grains of a formation necessary to stop movement of the grains when fluids flow through the formation, and may often be located at the near wellbore region because of high pressure drops. Such low cohesive strengths may have a measured compressive strength of less than about 10 psi. Subterranean formations may also have unconsolidated particulates therein due to frequent entrainment with produced fluids. The polymerizable aqueous consolidation compositions and the water-soluble polymerization initiator compositions described herein are capable of consolidating these particulates, as well as proppant particulates placed within a fracture in a subterranean formation, so as compact and cement in place the unconsolidated particulates and/or proppant particulates such that they become a substantially conglomerated mass with high cohesive strengths.

In some embodiments, the polymerizable aqueous consolidation composition, the substantially solids-free aqueous flush fluid, and the water-soluble polymerization initiator composition comprise an aqueous base fluid. Suitable aqueous based fluids for use in any of these fluids may include, but are not limited to, fresh water; saltwater (e.g., water containing one or more salts dissolved therein); brine (e.g., saturated salt water); seawater; formation water; produced water; and any combination thereof.

When the solubility of the polyvalent metal salt of carboxylic acid, the water-soluble polymerization initiator, or other components that may be added to the fluids described herein are low, a solvent may optionally be included with the aqueous base fluid so as to aid in solubility and/or polymerization and curing of the polyvalent metal salt of carboxylic acid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof.

The polyvalent metal salt of a carboxylic acid may be any such substance capable of polymerization and curing by the water-soluble polymerization initiator alone or in the presence of one or more polymerization agents in the polymerizable aqueous consolidation composition. Suitable carboxylic acids (R—COOH) wherein R is a polymerizable olefinically unsaturated functional group for use in the polyvalent metal salts of carboxylic acids may include, but are not limited to, an acrylic acid; an alkyl-acrylic acid; and any combination thereof. As defined herein, the term "alkyl-acrylic acid" refers to a $C_1$-$C_{20}$ alkyl-acrylic acid in which the alkyl group is bonded to the carbon that is also bonded to the carboxylic acid. Suitable carboxylic acids may include, but are not limit to, acrylic acid; methacrylic acid; itaconic acid; maleic acid; fumaric acid; and any combination thereof.

Suitable polyvalent metals for use in the polyvalent metal salt of a carboxylic acid include, but are not limited to, an aluminum ion; a barium ion; a calcium ion; a cobalt ion; a copper ion; an iron ion; a lead ion; a magnesium ion; a nickel ion; a tin ion; a zinc ion; and any combination thereof. One of ordinary skill in the art, with the benefit of this disclosure, will recognize the proper combination of carboxylic acid(s) and polyvalent metal(s) to select to form the polyvalent metal salt of a carboxylic acid disclosed in some embodiments herein. Factors that may affect such selection include, but are not limited to, the degree of solubility of the polyvalent metal salt of carboxylic acid in water, the conditions of the subterranean formation being treated (e.g., temperature), the type of subterranean treatment to be performed, the type of water-soluble polymerization initiator selected, the type of polymerization agent selected, if any, the desired polymerization time, and the like. Suitable commercially available polyvalent metal salts of carboxylic acids may include, but are not limited, to AC-400® and GELACRYL SUPERFLEX available from De Neef Construction Chemicals, Inc. in Houston, Tex.

In exemplary embodiments, the polyvalent metal salt of a carboxylic acid is a magnesium acrylate; a magnesium methacrylate; and any combination thereof. The polyvalent metal salt of a carboxylic acid may be present in the polymerizable aqueous consolidation composition in an amount in the range of from an upper limit of about 25%, 24%, 22%, 20%, 18%, 16%, 14%, and 12% to a lower limit of about 2%, 4%, 6%, 8%, 10%, and 12% by weight of the polymerizable aqueous consolidation composition. In some embodiments, the polyvalent metal salt of a carboxylic acid may be present in the polymerizable aqueous consolidation composition in an amount in the range of from about 5% to about 15% by weight of the polymerizable aqueous consolidation composition. When the weight of the unconsolidated particulates and/or proppant particulates is known, approximately known, or estimable, the polyvalent metal salt of a carboxylic acid may be included in the polymerizable aqueous consolidation composition of the embodiments described herein in an amount in the range of from an upper limit of about 10%, 9%, 8%, 7%, 6%, and 5% to an lower limit of about 1%, 2%, 3%, 4%, and 5% by weight of the of the unconsolidated particulates or proppant particulates.

In some embodiments, the polymerizable aqueous consolidation compositions may contain a polymerization agent that may aid in controlling the polymerization time at a given temperature. Suitable polymerization agents include, but are not limited to, an amine; an amino alcohol; and any combination thereof. Suitable amines for use in the polymerizable aqueous consolidation compositions disclosed herein may include, but are not limited to, diethylene triamine; triethylene tetraamine; tetraethylene pentaamine; a polymeric amine (e.g., polyethyleneeimine, polyvinylamine, and the like); N,N-bis-(2-hydroxyethyl para-toluidine; Fe(III)-tetraamidomacrocyclic ligand; and any combination thereof. Derivatives of these compounds may also be used. Suitable amino alcohols for use in the polymerizable aqueous consolidation compositions disclosed herein may include, but are not limited to, ethanolamine; diethanolamine; triethanolamine; propanolamine; tripropanolamine; any derivative thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. In exemplary embodiments, the amino alcohol selected is triethanolamine. The polymerization agent may be present in the polymerizable aqueous consolidation composition in a concentration in an amount in the range of from about 10 times to about 0.1 times the concentration of the water-soluble polymerization initiator in the water-soluble polymerization initiator composition, including all values therebetween. In some embodiments, the polymerization agent may be present in the polymerizable aqueous consolidation composition described herein in an amount in the range of from an upper limit of about 2%, 1.8%, 1.6%, 1.4%, 1.2%, 1%, and 0.8% to a lower limit of about 0.01%, 0.20%, 0.4%, 0.6%, and 0.8% by weight of the polymerizable aqueous consolidation composition.

As discussed above, the water-soluble polymerization initiator composition may comprise a water-soluble polymerization initiator selected from the group consisting of an inorganic water-soluble polymerization initiator; an organic water-soluble polymerization initiator; and any combination thereof. The inorganic water-soluble polymerization initiator for use in the embodiments disclosed herein may include, but is not limited to, a peroxy salt. Suitable peroxy salts may include, but are not limited to, sodium persulfate; potassium persulfate; ammonium persulfate; sodium perborate; sodium percarbonate; any derivative thereof; and any combination thereof. In exemplary embodiments, the inorganic water-soluble polymerization initiator selected is sodium persulfate. The inorganic water-soluble polymerization initiator may be present in an amount in the range of from and upper limit of about 5%, 4.8%, 4.6%, 4.4%, 4.2%, 4%, 3.8%, 3.6%, 3.4%, 3.2%, 3%, 2.8%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the water-soluble polymerization initiator composition. In other embodiments, the inorganic water-soluble polymerization initiator may be present in an amount in the range of from about 1% to about 2% by weight of the water-soluble polymerization initiator composition.

Suitable organic water-soluble polymerization initiators for use in the embodiments disclosed herein may include, but are not limited to, an azo-initiator; a peroxide initiator; a hydroperoxide initiator; and any combination thereof. Specific examples of suitable organic water-soluble polymerization initiators include, but are not limited to 2,2'-azobis (2-methylpropionamidine)dihydrochloride; di-t-butylhydroperoxide; benzoyl peroxide; t-butylhydroperoxide; and any combination thereof. A suitable example of a commercially available organic water-soluble polymerization initiator composition is PERM C™, available from Halliburton Energy Services, Inc. in Houston, Tex. The organic water-soluble polymerization initiator may be present in an amount in the range of from an upper limit of about 1%, 0.9%, 0.8%, 0.7%, 0.6%, and 0.5% to a lower limit of about 0.01%, 0.05%, 0.1%, 0.2%, 0.3%, 0.4%, and 0.5% by weight of the water-soluble polymerization initiator composition. In other embodiments, the organic water-soluble polymerization initiator may be present in an amount in the range of from about 0.05% to about 0.5% by weight of the water-soluble polymerization initiator composition.

In some embodiments, the polymerizable aqueous consolidation composition may further comprise a non-ionic carboxylic acid derived comonomer. The non-ionic carboxylic acid derived comonomer may be present to aid in the polymerization and curing process and to provide additional carboxylic acid monomers having variable hydrophobicities or desired molecular weights, if needed. Suitable non-ionic carboxylic acid derived comonomers include esters, amides, and nitriles of acrylic acid; methyl acrylate; ethyl acrylate; methyl methacrylate; ethyl methacrylate; hydroxyethyl acrylate; hydroxypropyl acrylate; hydroxybutyl acrylate; hydroxyethyl methacrylate; hydroxypropyl methacrylate; hydroxyisobutyl acrylate; hydroxyisobutyl methacrylate; dimethyl maleate; monoethyl maleate; diethyl maleate; 2-ethylhexyl acrylate; 2-ethylhexyl methacrylate; acrylamide; methacrylamide; N-dimethyl acrylamide; N-tert-butyl acrylamide; acrylonitrile; methacrylonitrile; dimethylaminoethyl acrylate; dimethylaminoethyl methacrylate; diethylaminoethyl methacrylate; diethylaminoethyl methacrylate; any derivatives thereof; and any combinations thereof. In some embodiments, the non-ionic carboxylic acid derived comonomer may be present in the polymerizable aqueous consolidation composition in an amount in the range of from an upper limit of about 10%, 9%, 8%, 7%, 6%, and 5% to a lower limit of about 0.01%, 0.05%, 1%, 2%, 3%, 4%, and 5% by weight of the polymerizable aqueous consolidation composition. In some embodiments, the non-ionic carboxylic acid derived comonomer may be present in the polymerizable aqueous consolidation composition in an amount in the range of from about 0.1% to about 5% by weight of the polymerizable aqueous consolidation composition.

In some embodiments, the polymerizable aqueous consolidation composition or the water-soluble polymerization initiator composition may further comprise a coupling agent; a polymerization retarder; a crosslinker; and any combination thereof.

A coupling agent may be included in the polymerizable aqueous consolidation composition or the water-soluble polymerization initiator composition in some embodiments disclosed herein so as to, among other things, help coat the polymerizable aqueous consolidation composition onto the unconsolidated particulates and/or proppant particulates. As used herein, the term "coupling agent" refers to a compound whose molecules contain functional groups that bond with both organic and inorganic materials. Coupling agents may be capable of aiding in the bonding, adsorption, or adhesion of materials having differing polarities. Suitable coupling agents may include, but are not limited to a quaternary ammonium coupling agent; a silicone-based coupling agent (e.g., a silicone-based coupling agent comprising a siloxy moiety); and any combination thereof. Suitable quaternary ammonium coupling agents may comprise may comprise at least one alkyl group that contains a $C_6$-$C_{22}$ carbon chain including, but not limited to, trimethyltallowammonium chloride; trimethylcocoammonium chloride; oxtadecyltrimethylammonium bromide; dioctylammonium chloride; trioctylammonium chloride; any derivative thereof; and any combination thereof. A suitable commercially available quaternary ammonium coupling agent is 19N™, available from Halliburton Energy Services, Inc. in Houston, Tex.

Suitable silicone-based coupling agents may include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; gamma-ureidopropyl-triethoxysilanes; beta-(3-4 epoxy-cyclohexyl)-ethyltrimethoxysilane; vinyltrichlorosilane; vinyltris(beta-methoxyethoxy)silane; vinyltriethoxysilane; vinyltrimethoxysilane; 3-methacryloxypropyltrimethoxysilane; r-glycidoxypropylmethylidiethoxysilane; 3-aminopropyl-triethoxysilane; N-phenyl-r-aminopropyltrimethoxysilane; r-mercaptopropyltrimethoxysilane; r-chloropropyltrimethoxysilane; r-glycidoxypropylmethylidiethoxysilane; N-beta-(aminoethyl)-r-aminopropylmethyldimethoxysilane; r-aminopropyltriethoxysilane; N-[3-(trimethoxysilyl)propyl]-ethylenediamine; any derivative thereof; and any combination thereof.

In some embodiments, the coupling agent may be present in an amount from an upper limit of about 5%, 4.8%, 4.6%, 4.4%, 4.2%, 4%, 3.8%, 3.6%, 3.4%, 3.2%, 3%, 2.8%, and 2.6% to a lower limit of about 0.1%, 0.2%, 0.4%, 0.6%, 0.8%, 1%, 1.2%, 1.4%, 1.6%, 1.8%, 2%, 2.2%, 2.4%, and 2.6% by weight of the polymerizable aqueous consolidation composition or the water-soluble polymerization initiator composition. In some embodiments, the coupling agent may be present in the treatment fluids in an amount from about 0.5% to about 3% by weight of the polymerizable aqueous consolidation composition or the water-soluble polymerization initiator composition. When the weight of the unconsolidated particulates and/or proppant particulates is known, approximately known, or estimable the coupling agents may be present in an amount in the range of from about 0.05% to about 0.2% by weight of the of the unconsolidated particulates and/or proppant particulates.

The polymerizable aqueous consolidation composition or the water-soluble polymerization initiator composition may further comprise a polymerization retarder. The polymerization retarder may act upon either or both of the inorganic water-soluble polymerization initiator or the organic water-soluble polymerization initiator to slow the polymerization reaction. Suitable polymerization retarders may include, but are not limited to, potassium ferricyanide; potassium manganicyanide; hydroquinone; a nitrophenol; a eugenol; and any combination thereof. Derivatives of these may also be used as polymerization retarders. In exemplary embodiments, the polymerization retarder is potassium ferricyanide. The polymerization retarder may be present in an amount in the range of from an upper limit of about 1000 parts per million ("ppm"), 900 ppm, 800 ppm, 700 ppm, 600 ppm, 500 ppm, 400 ppm, 300 ppm, 200 ppm, and 100 ppm to a lower limit of about 10 ppm, 20 ppm, 30 ppm, 40 ppm, 50 ppm, 60 ppm, 70 ppm, 80 ppm, 90 ppm, and 100 ppm by weight of the polymerizable aqueous consolidation composition or the water-soluble polymerization initiator composition. In some embodiments, the polymerization retarder may be present in an amount in the range of from about 50 ppm to about 250 ppm by weight of the polymerizable aqueous consolidation composition or the water-soluble polymerization initiator composition.

In some embodiments, the polymerizable aqueous consolidation composition or the water-soluble polymerization initiator composition may further comprise a crosslinker. The crosslinker may aid in the formation of a water-insoluble three dimensional polymer network once the water-soluble polymerization initiator composition has initiated polymerization. A crosslinker may be included when the polymerizable aqueous consolidation composition and the water-soluble polymerization initiator composition selected require accelerated formation of the water-insoluble three dimensional polymer network or when conditions in the subterranean formation may result in reduced polymer molecular weights. Suitable crosslinkers may include, but are not limited to, ethylene bisacrylamide; methylene bisacrylamide; trimethylol propane triacrylate; trimethylol propylene diacrylate; ethyleneglycol diacrylate; pentaerythrytol triacrylate; pentaerythrytol diacrylate; triallylcyanurate; and any combination thereof. In exemplary embodiments, the crosslinker is methylene bisacrylamide. The crosslinker may be present in an amount in the range of from an upper limit of about 2000 ppm, 1800 ppm, 1600 ppm, 1400 ppm, 1200 ppm, 1000 ppm, 800 ppm, 600 ppm, and 400 ppm to a lower limit of about 50 ppm, 60 ppm, 70 ppm, 80 ppm, 90 ppm, 100 ppm, 200 ppm, and 400 ppm by weight of the polymerizable aqueous consolidation composition or the water-soluble polymerization initiator. In some embodiments, the crosslinker may be present in the treatment fluids of the embodiments herein in an amount in the range of from about 100 ppm to about 1000 ppm by weight of the polymerizable aqueous consolidation composition or the water-soluble polymerization initiator.

In certain embodiments, the polymerizable aqueous consolidation composition may further comprise proppant particulates. Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh or even finer on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof. In certain embodiments, the particulates may be present in the first treatment fluids or single treatment fluids in an amount in the range of from an upper limit of about 30 pounds per gallon ("ppg"), 25 ppg, 20 ppg, 15 ppg, and 10 ppg to a lower limit of about 0.5 ppg, 1 ppg, 2 ppg, 4 ppg, 6 ppg, 8 ppg, and 10 ppg by volume of the polymerizable aqueous consolidation composition.

In various embodiments, systems configured for delivering the treatment fluids described herein to a downhole location are described. In various embodiments, the systems can comprise a pump fluidly coupled to a tubular, the tubular containing the polymerizable aqueous consolidation compositions and/or the water-soluble polymerization initiator compositions, and any additional additives, disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a portion of a subterranean formation comprising unconsolidated particulates; introducing a polymerizable aqueous consolidation composition into the portion of the subterranean formation so as to contact the unconsolidated particulates with the polymerizable aqueous consolidation composition, thereby creating coated, unconsolidated particulates; wherein the polymerizable aqueous consolidation composition comprises: an aqueous base fluid, a polyvalent metal salt of a carboxylic acid (R—COOH) wherein R is a polymerizable olefinically unsaturated functional group, and optionally at least one polymerization agent selected from the group consisting of: an amine; an amino alcohol; and any combination thereof; introducing a substantially solids-free, aqueous flush fluid into the portion of the subterranean formation so as to remove the polymerizable aqueous consolidation composition from interstitial spaces between the coated, unconsolidated particulates; introducing a water-soluble polymerization initiator composition into the portion of the subterranean formation so as to contact the coated, unconsolidated particulates, wherein the water-soluble polymerization initiator composition comprises: an aqueous base fluid, and a water-soluble polymerization initiator; and consolidating the coated, unconsolidated particulates in the portion of the subterranean formation.

B. A method comprising: providing a portion of a subterranean formation; introducing a polymerizable aqueous consolidation composition into the portion of the subterranean formation at a rate and pressure sufficient to create or enhance at least one fracture therein, wherein the polymerizable aqueous consolidation composition comprises: an aqueous base fluid; proppant particulates; a polyvalent metal salt of a carboxylic acid (R—COOH) wherein R is a polymerizable olefinically unsaturated functional group; and optionally at least one polymerization agent selected from the group consisting of: an amine; an amino alcohol; and any combination thereof, wherein the polyvalent metal salt of the carboxylic acid and optionally the at least on polymerization agent contacts the proppant particulates, thereby creating coated, proppant particulates, and wherein the coated, proppant particulates are placed into the at least one fracture so as to form a proppant pack; introducing a substantially solids-free, aqueous flush fluid into the portion of the subterranean formation so as to remove the polymerizable aqueous consolidation composition from interstitial spaces between the coated, proppant particulates in the proppant pack; introducing a water-soluble polymerization initiator composition into the portion of the subterranean formation so as to contact the coated, unconsolidated particulates; wherein the water-soluble polymerization initiator composition comprises: an aqueous base fluid, and a water-soluble polymerization initiator; and consolidating the coated, proppant particulates in the proppant pack.

Each of embodiments A and B may have one or more of the following additional elements in any combination:

Element 1: Wherein the water-soluble polymerization initiator is selected from the group consisting of: an organic water-soluble polymerization initiator; an inorganic water-soluble polymerization initiator; and any combination thereof.

Element 2: Wherein the water-soluble polymerization initiator is the organic water-soluble polymerization initiator and wherein the steps of introducing a polymerizable aqueous consolidation composition and introducing a water-soluble polymerization initiator composition are performed simultaneously, followed by the step of: introducing a substantially solids-free, aqueous flush fluid into the subterranean formation so as to remove the polymerizable aqueous consolidation composition from interstitial spaces between the coated, unconsolidated particulates.

Element 3: Wherein the water-soluble polymerization initiator is the inorganic water-soluble polymerization initiator and wherein the steps of introducing a polymerizable aqueous consolidation composition and introducing a water-soluble polymerization initiator composition are separated by the step of: introducing a substantially solids-free, aqueous flush fluid into the subterranean formation so as to remove the polymerizable aqueous consolidation composition from interstitial spaces between the coated, unconsolidated particulates.

Element 4: Wherein the carboxylic acid of the polyvalent metal salt of a carboxylic acid is selected from the group consisting of an acrylic acid; an alkyl-acrylic acid; and any combination thereof.

Element 5: Wherein the polyvalent metal of the polyvalent metal salt of a carboxylic acid is selected from the group consisting of an aluminum ion; a barium ion; a calcium ion; a cobalt ion; a copper ion; an iron ion; a lead ion; a magnesium ion; a nickel ion; a tin ion; a zinc ion; and any combination thereof.

Element 6: Wherein the amine is selected from the group consisting of diethylene triamine; triethylene tetraamine; tetraethylene pentaamine; a polymeric amine (e.g., polyethyleneeimine, polyvinylamine, and the like); N,N-bis-(2-hydroxyethyl para-toluidine; Fe(III)-tetraamidomacrocyclic ligand; and any combination thereof.

Element 7: Wherein the amino alcohol is selected from the group consisting of ethanolamine; diethanolamine; triethanolamine; propanolamine; tripropanolamine; any derivative thereof; and any combination thereof.

Element 8: Wherein the inorganic water-soluble polymerization initiator composition is a peroxy salt.

Element 9: Wherein the polymerizable aqueous consolidation composition or the water-soluble polymerization initiator composition further comprises a coupling agent; a polymerization retarder; a crosslinker; and any combination thereof.

Element 10: Wherein the polymerizable aqueous consolidation composition further comprises a non-ionic carboxylic acid derived comonomer selected from the group consisting of an ester of acrylic acid; an amide of acrylic acid; a nitriles of acrylic acid; methyl acrylate; ethyl acrylate; methyl methacrylate; ethyl methacrylate; hydroxyethyl acrylate; hydroxypropyl acrylate; hydroxybutyl acrylate; hydroxyethyl methacrylate; hydroxypropyl methacrylate; hydroxyisobutyl acrylate; hydroxyisobutyl methacrylate; dimethyl maleate; monoethyl maleate; diethyl maleate; 2-ethylhexyl acrylate; 2-ethylhexyl methacrylate; acrylamide; methacrylamide; N-dimethyl acrylamide; N-tert-butyl acrylamide; acrylonitrile; methacrylonitrile; dimethylaminoethyl acrylate; dimethylaminoethyl methacrylate; diethylaminoethyl methacrylate; diethylaminoethyl methacrylate; and any combinations thereof.

Element 11: Wherein the polymerizable aqueous consolidation composition is introduced as a pill.

Element 12: Wherein the unconsolidated particulates in the subterranean formation are proppant particulates in a proppant pack in a fracture.

By way of non-limiting example, exemplary combinations applicable to A and B include: A with 1, 2, 4, and 5; A with 3, 11, and 12; B with 2, 6, 9, and 10; and B with 3 and 11.

To facilitate a better understanding of the embodiments herein, the following examples of preferred or representative embodiments are given. In no way should the following examples be read to limit, or to define, the scope of the invention.

EXAMPLE 1

In this example, five fluids according to some embodiments described herein were prepared and evaluated for their consolidation time. The fluids comprised a polymerizable aqueous consolidation composition mixture of magnesium acrylate (polyvalent metal salt of a carboxylic acid), available as AC-400® from De Neef Construction Chemicals, and an organic water-soluble polymerization initiator, available as Perm C™ from Halliburton Energy Services, Inc. in Houston, Tex. According to the supplier provided information with AC-400®, trace quantities of the crosslinker, methylene bisacrylamide, are present in the composition. To 15 milliliters ("mL") of an aqueous base fluid, as described in Table 1, 5 mL of AC-400® was added, along with 20 mg of Perm C™ (organic water-soluble polymerization initiator). Each sample demonstrated consolidation after 15 min at 65.6° C. (150° F.), regardless of the type of aqueous base fluid selected, changing from an initial viscosity of about 15-20 centipoise ("cP") to an insoluble, non-flowable mass at the end of the 15 min consolidation time. See Table 1 below for the treatment fluids compositions.

TABLE 1

| Polymerizable aqueous consolidation composition (5 mL) | Aqueous Base Fluid (15 mL) | Organic Water-Soluble Polymerization Initiator (20 mg) | Consolidation Time @ 65.6° C. |
|---|---|---|---|
| AC-400 ® | Fresh Water | Perm C ™ | 15 min |
| AC-400 ® | Fresh Water + 4% KCl | Perm C ™ | 15 min |
| AC-400 ® | Fresh Water + 12% KCl, 5% $MgCl_2 \cdot 6H_2O$ | Perm C ™ | 15 min |
| AC-400 ® | Fresh Water + 1% $C_2H_3NaO_2$ (sodium acetate) | Perm C ™ | 15 min |
| AC-400 ® | Fresh Water + 1% $C_2H_3NaO_2$ (sodium acetate) | Perm C ™ | 15 min |

EXAMPLE 2

In this example, a fluid according to some embodiments described herein was prepared and evaluated for compressive strength. To 5 mL of AC-400®, 20 mg of Perm C™ was added. The fluid was coated onto 100 g of 20/40 Brady sand by stirring the mixture with a spatula. The coated sand was packed into a 60 ml syringe using the syringe's plunger using minimal pressure. The packed syringe was heated to 100° C. (202° F.) for 48 hours to permit curing. Thereafter, the unconfined compressive strength ("UCS") of the cured, coated sand was tested using Instron Series 5584 equipment. The UCS value was 328 psi, indicating effective consolidation of the 20/40 Brady sand.

EXAMPLE 3

In this example, a fluid according to some embodiments described herein was prepared and evaluated for compressive strength. To 5 mL of AC-400®, 5 mg of Perm C™ was added. The fluid was coated onto 100 g of 20/40 Brady sand. The coated sand was packed into a 60 ml syringe using the syringe's plunger using minimal pressure. The packed syringe was heated to 100° C. (202° F.) for 48 hours to permit curing. Thereafter, the unconfined compressive strength ("UCS") of the cured, coated sand was tested using Instron Series 5584 equipment. The UCS value was 348 psi, indicating effective consolidation of the 20/40 Brady sand and no adverse effect by decreasing the concentration of Perm C™ in the treatment fluid

EXAMPLE 4

In this example, a fluid according to some embodiments described herein was prepared and evaluated for compressive strength. The fluid comprised a water-soluble polymerization initiator composition mixture of magnesium alkylacrylate (polyvalent metal salt of a carboxylic acid), available as GELACRYL SUPERFLEX, available from De Neef Construction Chemicals, and an organic water-soluble polymerization initiator, available as Perm C™ from Halliburton Energy Services, Inc. in Houston, Tex. To 5 mL of GELACRYL SUPERFLEX, 20 mg of Perm C™ were added. The fluid was coated onto 100 g of 20/40 Brady sand. The coated sand was packed into a 60 ml syringe using the syringe's plunger using minimal pressure. The packed syringe was heated to 100° C. (202° F.) for 48 hours to permit curing. Thereafter, the unconfined compressive strength ("UCS") of the cured, coated sand was tested using Instron Series 5584 equipment. The UCS value was 407 psi, indicating effective consolidation of the 20/40 Brady sand.

EXAMPLE 5

In this example, a fluid according to some embodiments described herein was prepared and evaluated for compressive strength. To 5 mL of GELACRYL SUPERFLEX, 20 mg of Perm C™ and 0.1 mL of 19N™ (quaternary ammonium coupling agent) were added. The fluid was coated onto 100 g of 20/40 Brady sand. The coated sand was packed into a 60 ml syringe using the syringe's plunger using minimal pressure. The packed syringe was heated to 100° C. (202° F.) for 48 hours to permit curing. Thereafter, the unconfined compressive strength ("UCS") of the cured, coated sand was tested using Instron Series 5584 equipment. The UCS value was 647 psi, indicating effective consolidation of the 20/40 Brady sand and enhanced compressive strength by addition of the coupling agent.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a portion of a subterranean formation comprising unconsolidated particulates;
introducing a polymerizable aqueous consolidation composition into the portion of the subterranean formation so as to contact the unconsolidated particulates with the polymerizable aqueous consolidation composition, thereby creating coated, unconsolidated particulates;
wherein the polymerizable aqueous consolidation composition comprises:
an aqueous base fluid,
a polyvalent metal salt of a carboxylic acid (R—COOH) wherein R is a polymerizable olefinically unsaturated functional group, and at least one polymerization agent consisting of an amine, and
a coupling agent comprising functional groups that bond with both organic and inorganic materials; and
then introducing a substantially solids-free, aqueous flush fluid into the portion of the subterranean formation so as to remove the polymerizable aqueous consolidation composition from interstitial spaces between the coated, unconsolidated particulates; and
then introducing a water-soluble polymerization initiator composition into the portion of the subterranean formation so as to contact the coated, unconsolidated particulates, wherein the water-soluble polymerization initiator composition comprises:
an aqueous base fluid, and
a water-soluble polymerization initiator; and
then consolidating the coated, unconsolidated particulates in the portion of the subterranean formation.

2. The method of claim 1, wherein the amine is selected from the group consisting of diethylene triamine; triethylene tetraamine; tetraethylene pentaamine; a polymeric amine; polyethyleneeimine; polyvinylamine; N,N-bis-(2-hydroxyethyl para-toluidine; Fe(III)-tetraamidomacrocyclic ligand; and any combination thereof.

3. The method of claim 1, wherein the polymerizable aqueous consolidation composition or the water-soluble polymerization initiator composition further comprises a coupling agent; a polymerization retarder; a crosslinker; and any combination thereof.

4. The method of claim 1, wherein the polymerizable aqueous consolidation composition further comprises a non-ionic carboxylic acid derived comonomer selected from the group consisting of an ester of acrylic acid; an amide of acrylic acid; a nitriles of acrylic acid; methyl acrylate; ethyl acrylate; methyl methacrylate; ethyl methacrylate; hydroxyethyl acrylate; hydroxypropyl acrylate; hydroxybutyl acrylate; hydroxyethyl methacrylate; hydroxypropyl methacrylate; hydroxyisobutyl acrylate; hydroxyisobutyl methacrylate; dimethyl maleate; monoethyl maleate; diethyl maleate; 2-ethylhexyl acrylate; 2-ethylhexyl methacrylate; acrylamide; methacrylamide; N-dimethyl acrylamide; N-tert-butyl acrylamide; acrylonitrile; methacrylonitrile; dimethylaminoethyl acrylate; dimethylaminoethyl methacrylate; diethylaminoethyl methacrylate; diethylaminoethyl methacrylate; and any combinations thereof.

5. The method of claim 1, wherein the polymerizable aqueous consolidation composition is introduced as a pill.

6. The method of claim 1, wherein the unconsolidated particulates in the subterranean formation are proppant particulates in a proppant pack in a fracture.

7. A method comprising:
providing a portion of a subterranean formation;
introducing a polymerizable aqueous consolidation composition into the portion of the subterranean formation at a rate and pressure sufficient to create or enhance at least one fracture therein,
wherein the polymerizable aqueous consolidation composition comprises:
an aqueous base fluid;
proppant particulates;
a polyvalent metal salt of a carboxylic acid (R—COOH) wherein R is a polymerizable olefinically unsaturated functional group;
a coupling agent comprising functional groups that bond with both organic and inorganic materials; and
at least one polymerization agent consisting of
an amine,
wherein the polyvalent metal salt of the carboxylic acid and the at least one polymerization agent contacts the proppant particulates, thereby creating coated, proppant particulates, and
wherein the coated, proppant particulates are placed into the at least one fracture so as to form a proppant pack; and
then introducing a substantially solids-free, aqueous flush fluid into the portion of the subterranean formation so as to remove the polymerizable aqueous consolidation composition from interstitial spaces between the coated, proppant particulates in the proppant pack; and
then introducing a water-soluble polymerization initiator composition into the portion of the subterranean formation so as to contact the coated, unconsolidated particulates;
wherein the water-soluble polymerization initiator composition comprises:
an aqueous base fluid, and
a water-soluble polymerization initiator; and
then consolidating the coated, proppant particulates in the proppant pack.

8. The method of claim 7, wherein the polymerizable aqueous consolidation composition or the water-soluble polymerization initiator composition further comprises a coupling agent; a polymerization retarder; a crosslinker; and any combination thereof.

* * * * *